US012610361B2

(12) United States Patent
Van Phan et al.

(10) Patent No.: US 12,610,361 B2
(45) Date of Patent: Apr. 21, 2026

(54) ENABLING SENSING-BASED SIDELINK COMMUNICATION

(71) Applicant: Nokia Technologies Oy, Espoo (FI)

(72) Inventors: Vinh Van Phan, Oulu (FI); Ling Yu, Kauniainen (FI); Zexian Li, Espoo (FI); Nuno Manuel Kiilerich Pratas, Gistrup (DK); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 18/030,010

(22) PCT Filed: Oct. 1, 2021

(86) PCT No.: PCT/EP2021/077099
§ 371 (c)(1),
(2) Date: Apr. 3, 2023

(87) PCT Pub. No.: WO2022/073869
PCT Pub. Date: Apr. 14, 2022

(65) Prior Publication Data
US 2023/0284207 A1 Sep. 7, 2023

(30) Foreign Application Priority Data
Oct. 7, 2020 (EP) ..................................... 20200502

(51) Int. Cl.
*H04W 72/1263* (2023.01)
*H04W 72/25* (2023.01)
*H04W 72/56* (2023.01)

(52) U.S. Cl.
CPC ....... *H04W 72/1263* (2013.01); *H04W 72/25* (2023.01); *H04W 72/56* (2023.01)

(58) Field of Classification Search
CPC . H04W 72/1263; H04W 72/25; H04W 72/56; H04W 4/40
See application file for complete search history.

(56) References Cited

U.S. PATENT DOCUMENTS

2020/0029318 A1 1/2020 Guo
2020/0037343 A1* 1/2020 He ......................... H04W 72/20
(Continued)

FOREIGN PATENT DOCUMENTS

CN 108810906 A 11/2018
WO WO 2020/033088 A1 2/2020
WO WO 2020/143745 A1 7/2020

*Primary Examiner* — Abdullahi Ahmed
(74) *Attorney, Agent, or Firm* — McCarter & English, LLP; Mark F. Harrington

(57) ABSTRACT

A method is disclosed including: performing a sensing on at least one of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources; selecting one or more resources from at least one of the first pool and the second pool for a SL transmission based on at least one outcome of the sensing on at least one of the first pool and the second pool; and transmitting data over SL using the selected one or more resources. An apparatus, computer program, and system are further disclosed.

19 Claims, 6 Drawing Sheets

(56)  References Cited

U.S. PATENT DOCUMENTS

| | | | |
|---|---|---|---|
| 2021/0219268 A1* | 7/2021 | Li | H04B 17/318 |
| 2023/0036892 A1* | 2/2023 | Liu | H04W 72/20 |
| 2023/0052126 A1* | 2/2023 | Nam | H04L 5/00 |
| 2023/0092094 A1* | 3/2023 | Ryu | H04W 72/20 |
| | | | 375/267 |
| 2023/0345527 A1* | 10/2023 | Li | H04W 74/0808 |

* cited by examiner

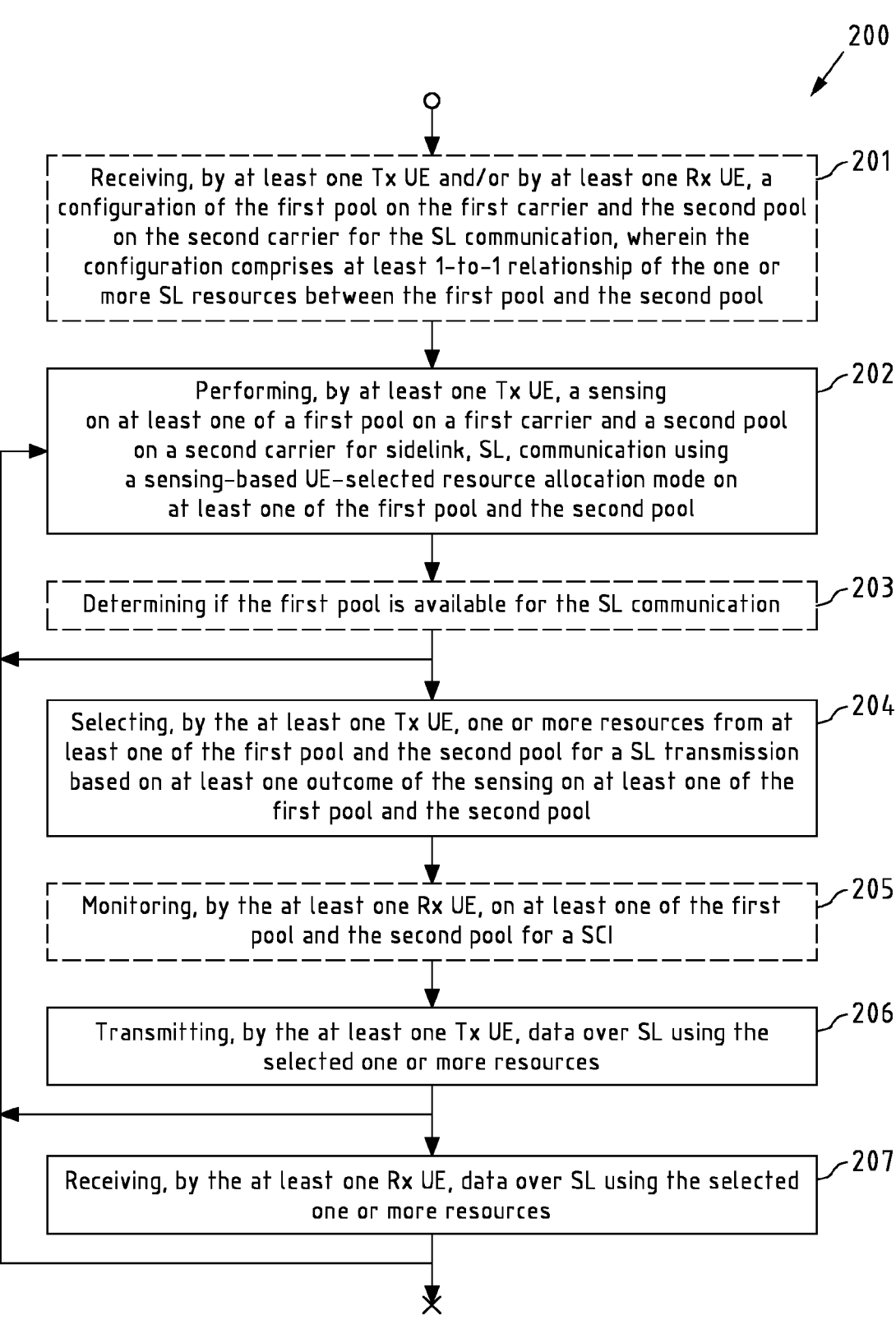

200

Receiving, by at least one Tx UE and/or by at least one Rx UE, a configuration of the first pool on the first carrier and the second pool on the second carrier for the SL communication, wherein the configuration comprises at least 1-to-1 relationship of the one or more SL resources between the first pool and the second pool
201

Performing, by at least one Tx UE, a sensing on at least one of a first pool on a first carrier and a second pool on a second carrier for sidelink, SL, communication using a sensing-based UE-selected resource allocation mode on at least one of the first pool and the second pool
202

Determining if the first pool is available for the SL communication
203

Selecting, by the at least one Tx UE, one or more resources from at least one of the first pool and the second pool for a SL transmission based on at least one outcome of the sensing on at least one of the first pool and the second pool
204

Monitoring, by the at least one Rx UE, on at least one of the first pool and the second pool for a SCI
205

Transmitting, by the at least one Tx UE, data over SL using the selected one or more resources
206

Receiving, by the at least one Rx UE, data over SL using the selected one or more resources
207

Fig.2

ENABLING SENSING-BASED SIDELINK COMMUNICATION

CROSS REFERENCE TO RELATED APPLICATION

This patent application is a U.S. National Stage application of International Patent Application Number PCT/EP2021/077099 filed Oct. 1, 2021, which is hereby incorporated by reference in its entirety, and claims priority to EP 20200502.1 filed Oct. 7, 2020.

FIELD

The following disclosure relates to the field of mobile communication networks, or more particularly relates to systems, apparatuses, and methods for enabling sensing-based (e.g. Mode 2) operation for sidelink (SL) communication.

BACKGROUND

In 3GPP Long Term Evolution in unlicensed spectrum (LTE-U) and New Radio in unlicensed spectrum (NR-U) for cellular access with communications between a User Equipment (UE) and a serving base station (BS) over Uu Interface in unlicensed (U) spectrum or band (U-band) have been studied and standardized. However, SL communications between UEs over PC5 interface in U-band have not been studied in 3GPP so far but anticipated in future releases for efficient IIoT (Industrial Internet-of-Things) supports for example.

SL communications between UEs over PC5, e.g. as described in Technical Specification (TS) 36.300 for LTE and TS 38.300 for NR, are based on the principle of transmitter (Tx UE) oriented one-to-many broadcast. This means that in principle there is no need for a connection setup for SL communication between UEs on the radio-access level, regardless of whether SL communication is for unicast, groupcast or broadcast service.

On one hand, a Tx UE transmits via SL to a receiver (Rx) UE or a group of Rx UEs or all Rx UEs in proximity of the Tx UE using resources from a (pre-) configured resource pool, at least for transmitting SL control information (SCI) which is used as a scheduling assignment for a respective SL data transmission. On the other hand, the Rx UEs need to keep monitoring over the (pre-) configured resource pool to receive SL, at least receiving all SCI instances and determining whether a received SCI and corresponding SL data transmission is meant for Rx UE to receive or not based on source (SRC) and/or destination (DST) ID(s) indicated in the received SCI instances. SRC is corresponding to the Tx side and DST is corresponding to the Rx side. This may be applied for all casting types over SL: Unicast, groupcast or broadcast.

Strict requirements of U-band communications into current PC5 with minimum changes to the current PC5 interface and the serving network should be met. The requirements of U-band communications include, for example, Listen Before Talk (LBT) for Clear Channel Assessment (CCA) to get a Channel Occupancy Time (COT) of up to about 10 ms with strict constraints on channel assessments and continuous transmissions during the acquired COT.

The use of U-band for SL communications of UEs in proximity is tied to LBT for CCA to acquire a COT and how the acquired COT is maintained against the requirement on continuous transmissions within the acquired COT. COT sharing in which a COT provider acquired a COT and grant to other devices in proximity to transmit within the acquired COT without a need or with a reduced need to perform LBT by each of the device is beneficial in general. This is particularly applicable for SL communications in a local service area of targeted IIoT systems for the following reasons: (i) SL communication is in principle a broadcast-based proximity communication on a pre-configured resource pool common to all local UEs; (ii) local UEs with Mode 2 may need to perform sensing on the pre-configured resource pool which should better not be impacted by additional LBT which may be needed for a possible transmission on U-band. It may be allowed that COT sharing is provided for local UEs to use U-band for SL communications.

SUMMARY OF SOME EXEMPLARY EMBODIMENTS

In general, the availability and therefore the use of U-band is of opportunistic nature. It is practical to consider that the use of U-band is coupled with the use of a licensed band (L-band) under control of a serving network. That is, a resource pool in U-band, denoted as U-pool, and a resource pool in L-band, denoted as L-pool, should be configured to local UEs for SL communications by a serving network. The use of U-pool is for opportunistic SL offload or duplication within a current COT, as acquired and shared to local UEs, for reducing load and enhancing resource utility on L-pool, or enhancing reliability of SL transmission for examples.

It is important to note that 3GPP Radio Access Technologies (RATs) are frame-based systems. The preconfigured resource pools for SL transmission and reception therefore follow the system frame structures and synchronizations of the serving network. The synchronization for SL transmission may be provided by either the serving network for in-coverage (IC) operation or UE(s) acting as SL synchronization source(s) for out-of-coverage (OOC) operation.

The current Mode 2 sensing, as specified in 3GPP for SL transmission of the UE in Mode 2, is based on e.g. the last, e.g., 1000 ms sensing period of the sensing history which is used for the resource selection of the UE. This is under the assumption that the corresponding Mode 2 resource pool is pre-configured for a long-term availability (e.g. semi-permanent) which cannot be reassured with U-pool.

It is thus, inter alia, an object to enable and facilitate SL communications using PC5 interface, focusing on but not limited to IIoT applications. It is a further object to enable the current sensing-based Mode 2, the autonomous UE-selected resource allocation on U-pool, given the opportunistic nature of U-pool.

According to a first exemplary aspect, a method is disclosed, the method comprising:

performing a sensing on at least one of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources;

selecting one or more resources from at least one of the first pool and the second pool for a SL transmission based on at least one outcome of the sensing on at least one of the first pool and the second pool; and transmitting data over SL using the selected one or more resources.

This method may for instance be performed and/or controlled by an apparatus, for instance an electronic device, e.g. a mobile terminal. The apparatus may be a transmitting (Tx) UE (User Equipment), Tx UE participating in a SL communication. For instance, the method may be performed and/or controlled by using at least one processor of the electronic device.

A respective apparatus according to the first exemplary aspect may serve as a receiving (Rx) UE for participating in a SL communication, e.g. when it should serve as a recipient of SL data for another apparatus according to the first exemplary aspect. Additionally or alternatively, a respective apparatus according to the first exemplary aspect may also serve as the transmitting, Tx, UE for participating in a SL communication, e.g. when it intends to transmit SL data to another apparatus, e.g. a Rx UE.

According to a second exemplary aspect, a method is disclosed, the method comprising:

determining a configuration of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources, and wherein the configuration comprises the at least 1-to-1 relationship of SL resources between the first pool and the second pool; and providing the configuration.

This method may for instance be performed and/or controlled by an apparatus, for instance a base station, e.g. of a mobile communication network. For instance, the method may be performed and/or controlled by using at least one processor of the base station.

According to a third exemplary aspect, a method is disclosed, the method comprising:

performing, by at least one Tx UE, a sensing on at least one of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources;

selecting, by the at least one Tx UE, one or more resources from at least one of the first pool and the second pool for a SL transmission based on at least one outcome of the sensing on at least one of the first pool and the second pool;

transmitting, by the at least one Tx UE, data over SL using the selected one or more resources; and receiving, by the at least one Rx UE, data over SL.

This method may for instance be performed and/or controlled by at least one apparatus according to the first exemplary aspect, and at least one apparatus according to the second exemplary aspect. The apparatus according to the first exemplary aspect may be a Tx UE. For instance, the method may be performed and/or controlled by using at least one processor of the respective apparatus.

According to a further exemplary aspect, a computer program is disclosed, the computer program when executed by a processor causing an apparatus, for instance an electronic device, to perform and/or control the actions of the method according to the first, second and/or third exemplary aspect.

The computer program may be stored on computer-readable storage medium, in particular a tangible and/or non-transitory medium. The computer readable storage medium could for example be a disk or a memory or the like.

The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first, second and/or third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the above disclosed apparatus(es), at least to perform and/or to control the method according to the first, second and/or third exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:

at least one apparatus according to the first exemplary aspect as disclosed above, and at least one Rx UE, wherein the at least one apparatus according to the first exemplary aspect and the at least one Rx UE are configured by at least one apparatus according to the second exemplary aspect (e.g. a base station of a mobile communication network). The at least one apparatus and the at least one Rx UE may be configured e.g. via a provided configuration so that the at least one apparatus according to the first exemplary aspect and the at least one Rx UE perform and/or control the method according to the third exemplary aspect together.

In the following, exemplary features and exemplary embodiments of all aspects will be described in further detail.

The sensing may be performed and/or controlled on at least one of the first pool on the first carrier and/or the second pool on the second carrier for SL communication. The first pool may be U-pool (Unlicensed pool). The second pool may be a L-pool (e.g. Licensed pool). The sensing may be done by a Tx UE of a SL communication. The sensing may be needed for using a sensing-based UE-selected resource allocation mode on at least one of the first pool and the second pool. This mode is referred to as Mode 2 for SL communication in 3GPP. The first pool and the second pool have at least a 1-to-1 relationship (e.g. mapping) of SL resources. Thus, the at least 1-to-1 relationship may be a mapping in terms of building resource blocks, also referred to as physical resource blocks (PRBs), wherein e.g. the first pool may be an unlicensed pool in an unlicensed band, and the second pool may be a licensed pool in a licensed band available for SL transmissions. The mapping may be a 1-to-1 mapping. The mapping may be a 1-to-N mapping, as disclosed later in this specification. The mapping may be applied for (e.g. all) SL channels, e.g. including one or more of PSCCH, PSSCH and/or PSFCH. The scale of resource resolution on the second pool (e.g. L-pool) and the first pool (e.g. U-pool) may be different in at least a frequency domain, e.g. as the whole band of the first pool (e.g. U-band) may be used for the first pool. The first pool may be wider, thus, have more bandwidth than the second pool. For instance, due to the possible different subcarrier spacing, it may also be possible that a number of Orthogonal Frequency Division Multiplexing (OFDM) symbols within the same time period may be different between the second pool (e.g. L-pool) and the first pool (e.g. U-pool).

One or more resources may be selected by an apparatus according to the first exemplary aspect, e.g. Tx UE, from at least one of the first pool and the second pool for a SL transmission based on at least one outcome of the sensing on at least one of the first pool and the second pool, as performed by Tx UE. Then, a sidelink control information, SCI, for indicating that the data is scheduled on the selected one or more resources for at least one Rx UE is transmitted, e.g. from the Tx UE to the Rx UE. Accordingly, the SCI is received on at least one of the first pool and the second pool by the Rx UE. The SCI may indicate that the data is scheduled for the at least one Rx UE using the selected one or more resources.

Such an apparatus Tx UE or Rx UE (e.g. an electronic device) according to the first exemplary aspect, and/or such one or more Rx UEs, as described herein, may for instance be portable (e.g. weigh less than 1, 0.9, 0.8, 0.7, 0.6, 0.5, 0.4, 0.3, 0.2, 0.1 kg, or less), like a mobile phone, personal digital assistance device, computer, laptop computer, IoT device, wearable as a non-limiting examples. The apparatus, e.g. the Tx UE or the Rx UE, may for instance comprise or be connectable to a display for displaying information. The apparatus, e.g. the Tx UE or the Rx UE may for instance comprise or be connectable to means for outputting sound, e.g. in the form of spoken commands or information. The apparatus, e.g. the Tx UE or the Rx UE may for instance comprise or be connectable to one or more sensors for determining the devices position, such as for instance a GNSS receiver, in the form of a GPS receiver. The apparatus, e.g. the Tx UE or the Rx UE may for instance comprise or be connectable to one or more sensors, e.g. in the form of an accelerometer and/or a gyroscope and/or magnetometer and/or barometer for gathering (e.g. measuring) further information, such as motion sensor data. The apparatus, e.g. the Tx UE or the Rx UE may for instance comprise or be connectable to a receiver and/or a transmitter (e.g. a transceiver) for receiving and/or sending information.

The mobile communication network may for instance be cellular network. The mobile communication network may for example be a mobile phone network like a 2G/3G/4G/5G (e.g. LTE)/New Radio (NR) and/or future cellular communication network. The 2G/3G/4G/5G/NR cellular radio communication standards are developed by the 3GPP and presently available under http://www.3gpp.org/.

According to an exemplary embodiment of all exemplary aspects, the apparatus, e.g. the Tx UE or the Rx UE is configured to perform sensing in Mode 2 operation.

There are two modes of resource allocation, referred to as Mode 1 and Mode 2, specified in 3GPP for a SL transmission. Mode 1 is based on using scheduled resources or grants from a serving base station (BS). This implies that a Tx UE may need to be in RRC CONNECTED state of the serving BS in order to get Mode 1 resources allocated. Mode 2 is based on autonomous allocation or selection of resources from a pre-configured Tx resource pool by a Tx UE. The resource selection in Mode 2 can be based on a simple random selection or sensing-based selection. The latter is preferred and used for normal operation while the former is used for exceptional operations or situations with a particular, pre-configured resource pool. Mode 2 can be used for a respective Tx UE being IC or DOC, in RRC IDLE, RRC INACTIVE or RRC CONNECTED STATE.

After the selected one or more resources are provided to the one or more apparatuses configured as receiving devices (e.g. Rx UEs), data can be transmitted over SL using the selected one or more resources.

In some example embodiments according to all exemplary aspects, e.g. the Tx UE or the Rx UE may be configured with the first pool (e.g. U-pool) coupled with an associated (e.g. semi-permanent) second pool (e.g. L-pool) for SL communications to perform sensing-based Mode 2, wherein there may be a 1-to-1 mapping of SL resources between U-pool and L-pool in terms of the PRBs. The at least 1-to-1 (1:1) relationship respectively mapping of the one or more SL resources between the first pool (e.g. U-pool) and the second pool (e.g. L-pool) can be applied for all SL channels including, but not limited to, PSCCH, PSSCH, PSFCH, or a combination thereof. The use of the first pool (e.g. U-pool) is subject to the availability of the U-pool in accordance with a COT acquired on the first carrier (e.g. U-band) of the first pool (e.g. U-pool).

By the sensing of at least one of the first pool (e.g. U-pool) and the second pool (e.g. L-pool), the resource(s) selection and reservation e.g. for Mode 2 operation can be maintained on both the first pool and the second pool, regardless of whether the first pool is currently available or not.

According to an exemplary embodiment of all exemplary aspects, the sensing (e.g. by the at least one Tx UE) on at least one of the first pool and the second pool is performed continuously.

Such a continuous sensing may enable that resource selection and reservation is maintained on both first pool and second pool regardless whether the first pool is currently available for SL transmission of data or not. By performing and/or controlling continuous sensing, the method(s) according to the first, and/or third exemplary aspect(s) is (are) performed repeatedly. Based on availability of the first pool, it can be switched between the first pool on the first carrier and the second pool of the second carrier for data transmission via SL.

Continuous sensing may be done by the respective apparatus (e.g. Tx UE) according to the first exemplary aspect for SL Mode 2 operation, as disclosed above. This may allow for using the current sensing-based Mode 2 for SL communications on the first pool (e.g. U-pool) even though availability of the first pool (e.g. U-pool) for SL transmissions may change dynamically depending on whether COT is available or not.

According to an exemplary embodiment of all exemplary aspects, the method further comprises:

receiving a configuration of the first pool on the first carrier and the second pool on the second carrier for the SL communication, wherein the configuration comprises the at least 1-to-1 relationship of the one or more SL resources between the first pool and the second pool.

For instance, the apparatus (e.g. Tx UE, apparatus according to the first exemplary aspect) intending to transmit data via SL and/or the one or more apparatuses receiving data via SL (e.g. Rx UEs) may receive the configuration, e.g. from a (e.g. serving) base station of a mobile communication network. The respective apparatus(es) may be configured by the received configuration. The configuration comprises, at least in part, information enabling a mapping between one or more building resource blocks (also referred to as PRBs) of the first pool (e.g. U-pool) and one or more of such building resource blocks of the second pool (e.g. L-pool).

Further, the configuration may enable the respective apparatus(es) to be configured to perform sensing for Mode 2 operation, e.g. monitor control information (e.g. SCI) that are broadcasted, unicasted, and/or groupcasted on a PSCCH from other apparatus(es) (e.g. other Tx UEs in proximity). Such other apparatus(es) may be located in a proximity of the respective apparatus according to the first exemplary aspect intending to transmit data via SL so that data communication can take place via SL. The control information may be sent on a PSCCH of the first pool and/or of the second pool. Further, the control information may be sent on the first pool when the first pool is available. The control information may be sent on the second pool when the first pool is not available.

The configuration may be provided using either a broadcast system information (SIB) that may be common to (e.g. all) relevant UEs or dedicated signaling.

According to an exemplary embodiment of all exemplary aspects, the configuration further comprises control information causing the apparatus to use the first pool instead of the second pool for SL communication if the first pool is available, or else to use the second pool.

The apparatus (e.g. Tx UE or Rx UE) may further be configured to transmit and/or receive data via SL and perform sensing on the first pool (e.g. only) when the first pool is available. Alternatively or additionally, the apparatus may be configured to receive data via SL and perform sensing on the first pool regardless of whether the first pool is available, thus supported by the apparatuses performing and/or controlling the respective method(s) according to the first and/or third exemplary aspect(s), or not.

Such control information can be within the configuration information, e.g. in order to operate in a flexible way. Such control information can be within the configuration information depending on the configuration. For instance, in case both pools (first and second pool) are available, a respective base station may configure which pool has a higher priority to be used.

According to an exemplary embodiment of the first exemplary aspect, the method further comprises:

indicating, e.g. to a (serving) base station and/or one or more other apparatus(es) (e.g. UEs in proximity of the apparatus), whether the apparatus is enabled to use the first pool when the first pool is available or not.

Such an indicating may be part of a provision of UE capability information, e.g. provided to the respective apparatus according to the second exemplary aspect (e.g. a base station) by the apparatus according to the first exemplary aspect, and/or to one or more Rx UEs, to name but a few non-limiting examples. Further, the respective apparatus according to the first exemplary aspect may indicate (e.g. in the control information, e.g. SCI) at least when using or reserving resources from the second pool for a SL transmission whether it is enabled to use the first pool when the first pool is available or not. Apparatus(es) according to the first exemplary aspect that do not support the first pool operation may continue using the second pool even when the first pool is available. This may make the corresponding resources of the first pool 1-to-1 mapped on the one or more respective resources of the second pool reserved by this (these) respective apparatus(es) according to the first exemplary aspect (e.g. SL Tx UEs) unused. Apparatus(es) according to the first exemplary aspect which support first pool operation may be able to detect such unused one or more resources of the first pool. Thus, this may allow the apparatus(es) which support first pool operation to select a part of the detected unused resources of the first pool e.g. as additional resources for SL transmissions on the first pool.

According to an exemplary embodiment of the first exemplary aspect, the method further comprises:

indicating over SL that the apparatus is not enabled to use the first pool when using the second pool to transmit data over SL for SL communication The respective UE may indicate that the respective UE is not able to use the first pool particularly or whether the respective UE is able to transmit/receive SL in unlicensed spectrum, e.g. in general, or not, e.g. when using the second pool.

Furthermore, indicating to the apparatus according to the second exemplary aspect (e.g. base station), e.g. over Uu may be separated from an indicating to other UEs, e.g. over SL. Then, such indicating may be realized in different options, e.g. along with UE capability indication over Uu and/or SL; and/or in SCI over SL, to name but a few non-limiting examples. For instance, for the latter, a 1-bit indication in SCI may be used.

According to an exemplary embodiment of the first exemplary aspect, the method further comprises:

determining if the first pool is available for the SL communication; and wherein the one or more resources are selected from the first pool (e.g. for the SL communication) based on applicable outcomes of the determining and the sensing on at least one of the first pool and the second pool, and taking into account the at least 1-to-1 relationship.

The configured L-pool that has 1:1 mapping of resources with the configured U-pool may be dedicated to the SL Tx UEs that have the capability of supporting U-pool operation. Such an availability that the first pool can be utilized may be determined based on positive outcome of performing LBT and COT acquisition on the U-band of the U-pool. For example, if the first pool is available or can be utilized may be determined e.g. based, at least in part, on COT information e.g. provided by or received from a COT provider (e.g. via a base station of the mobile communication network).

Thus, the apparatus of the first exemplary aspect may determine that it can use the first pool and that the first pool is available for the SL communication. If it determines that it can use the first pool, the one or more resources to be used for the transmission of data are selected accordingly. Then, the apparatus of the first exemplary aspect may provide the selected resources to one or more Rx UEs that may be recipients of the data. Further, if an outcome of the performed sensing is that one or more resources of the first pool are not available although the respective apparatuses are enabled to perform SL via the first pool, the one or more resources selected for the transmission may be one or more resources of the second pool.

According to an exemplary embodiment of the first exemplary aspect, the method further comprises prior to transmitting data over SL:

providing (e.g. sending) a SL control information, SCI, comprising one or more selected resources of the first pool and/or the second pool via which the data is transmitted.

The apparatus according to the first exemplary aspect may provide (e.g. send) the SL control information, e.g. via broadcast, groupcast or unicast to one or more Rx UEs. The one or more Rx UEs may be in proximity to the respective apparatus (e.g. Tx UE) according to the first exemplary aspect With such a SCI, the apparatuses that are intended to perform and/or control SL communication may be configured to send at least first stage of such SCI e.g. over PSCCH on either the first pool and/or the second pool. Further, the SCI sent on at least one of the first pool and the second pool may comprise the one or more selected resources from the respective other at least one of the first pool and the second pool, e.g. at least for the resource reservation purpose. The one or more selected resources indicated in SCI from the first pool and/or the second pool for the resource reservation may imply that the corresponding resources from the respective other pool according to the 1-to-1 relationship/mapping between the respective resources are reserved by or for same apparatus (e.g. UE).

According to an exemplary embodiment of all exemplary aspects, the availability of the second pool on the second carrier (Licensed band) is semi-permanent. This means that the second pool, as configured to a UE, may be (e.g. always) available for SL communication of the UE. In comparison, the first pool on the first carrier (unlicensed band), as configured to a UE, can be used for SL communication of the UE (e.g. only) when the first carrier is available for the UE, and/or is subject to a COT (e.g. a pre-defined validity time interval) acquired for the UE on the first carrier in order to use the first pool. For instance, the second pool may be semi-permanent to enable to use the second pool as a fallback for SL communication in sensing-based Mode 2, e.g. in case the first pool may become unavailable.

For instance, a respective apparatus according to the first exemplary aspect may be configured to perform sensing for Mode 2 operation. A Rx UE may monitor for SCI that may be sent on a respective PSCCH from other apparatuses. Such other apparatuses may be in a proximity. Thus, the apparatus according to the first exemplary aspect may monitor for SCI sent on PSCCH, e.g. over a configured resource pool. The configured resource pool may consist of PSCCH resources of the first pool and/or the second pool. Further, the respective apparatus may monitor on the first pool (e.g. U-pool) and/or the second pool (e.g. L-pool). For instance, the respective apparatus may monitor on both the L-pool and the U-pool whenever the U-pool is available or even when the U-pool is not available to the respective apparatus. Then, the respective apparatus may use the sensing outcomes on both the L-pool and the U-pool for Mode 2 resource selection and reservation when the respective apparatus transmits on either the L-pool or the U-pool or both. Further, the sensing outcomes on the L-pool may be mapped on corresponding one or more resources on the U-pool, and/or vice versa, based on the configured 1-to-1 mapping of the one or more SL resources between the U-pool and the L-pool. This may be done in order to preserve and/or use the sensing outcomes on one pool to another pool, to name but one non-limiting example.

According to an exemplary embodiment of all exemplary aspects, the at least 1-to-1 relationship is a mapping of SL resources between the first pool and the second pool and is applied for a plurality SL channels.

The mapping may be applied on available SL channels. Additionally or alternatively, the mapping may be applied on all SL channels. Examples of SL channels, to which the mapping may be applied, may be PSCCH, PSSCH, PSFCH, or a combination thereof, to name but a few non-limiting examples.

According to an exemplary embodiment of all exemplary aspects, the SL resources comprise one or more building resource blocks that are mapped in at least one time-frequency domain from the first pool (e.g. U-pool) to the second pool (e.g. L-pool).

Alternatively, the SL resources comprise one or more building resource blocks that are mapped in at least one time-frequency domain from the second pool to the first pool. For instance, a U-pool building resource blocks number may be equal to a number of L-pool building resource blocks. Further, e.g. a certain U-pool PRB number (e.g. first in time, first in frequency range PRB; e.g. PRB number 11 of the U-pool) may be mapped to first in time, and first in frequency range PRB number (e.g. PRB number 11 of the L-pool) of the L-pool. It is noted that a scale of resource resolution on the second pool and the first pool may be different in at least the frequency domain. In general, this may be the case since e.g. U-pool uses the U-band, and the U-band may be wider. Thus, the spectrum covers more bandwidth than the L-band of the L-pool.

According to an exemplary embodiment of all exemplary aspects, the at least 1-to-1 relationship is a 1-to-N mapping of SL resources between the first pool and the second pool, wherein N resources of the first pool are mapped to one resource in the second pool.

The configuration that may be received by a respective apparatus according to the first and/or one or more Rx UEs may have a respective second pool (e.g. a configured L-pool) that has a 1-to-N (1:N) mapping of resources with a respective first pool (e.g. U-pool). In other words, there may be N resources mapped to one resource in the L-pool. The access to the resources in the L-pool are controlled via a traffic priority (e.g. a UE is only allowed to transition to the L-pool in case its traffic priority is above a certain priority threshold) and congestion level observed in the L-pool.

According to an exemplary embodiment of the second exemplary aspect, the configuration is provided to one or more UEs for enabling the UEs to perform sensing-based UE-selected resource allocation mode of the SL communication. For instance, the configuration is provided by the apparatus according to the second exemplary aspect to the apparatus according to the first exemplary aspect.

According to an exemplary embodiment of the second exemplary aspect, the configuration enables the one or more UEs (e.g. apparatus according to the first exemplary aspect) to act as a receiving, Rx, UE to receive SL transmission on at least one of the first pool and the second pool.

According to an exemplary embodiment of all exemplary aspects, the configuration further comprises a setting for the respective apparatus(es) according to the first exemplary aspect (e.g. one or more Tx UEs, or one or more Rx UEs) to use the first pool instead for SL transmissions whenever the first pool is available. Within the meaning of this disclosure, this may be also referred to as a full offload.

For instance, a respective apparatus according to the first exemplary aspect may be configured (e.g. via received configuration, as disclosed above) to use the first pool (e.g. U-pool) instead of the second pool (e.g. L-pool) for SL transmission of data whenever the first pool is available.

This may be applied for either individual apparatuses, or one or more (e.g. all) local apparatuses according to the first exemplary aspect. Such local apparatuses may be located in their respective proximity so that SL communication between them is possible. The latter may be applicable for a local IIoT system e.g. in a confined service area, such as a production room or a factory floor, to name but a few non-limiting examples. This may allow for efficient utilization of one or more resources of the second pool (e.g. semi-permanent L-pool resources), as such resources of the second pool—when not being used for SL communications—may be reclaimed and used for e.g. Uu communication(s) by a serving network (e.g. base station of the mobile communication network).

According to an exemplary embodiment of all exemplary aspects, access to the SL resources in the second pool is controlled via a traffic priority setting.

Such a traffic priority setting may for instance be comprised by the configuration, e.g. provided by a respective base station of a mobile communication network that is received by a respective apparatus according to the first exemplary aspect (e.g. one or more Tx UEs, or one or more Rx UEs).

To avoid collision on reserved one or more resources from the second pool when the first pool becomes unavailable and the respective apparatus(es) according to the first exemplary aspect, thus, may need to go back to using the second pool, a respective resource of the first pool with higher priority may be selected. For instance, the apparatus(es) according to the first exemplary aspect (e.g. SL Tx UEs) when using the first pool may select with higher priority or probability the one or more first pool resources that are not reserved in either the first pool and/or the second pool according to the configured 1-to-1 or a 1-to-N mapping, to name but a few non-limiting examples. This is due to, for examples, that the respective apparatus(es) according to the first exemplary aspect may share the second resource pool for SL communications with other UE(s) which may not be able or enabled to use the first pool, as disclosed above.

For instance, a respective apparatus according to the first exemplary aspect or aspect respective Rx UE with whom the apparatus according to the first exemplary aspect performs a SL communication may be allowed to transition to the second pool in case its traffic priority is above a certain priority (e.g. and pre-defined) threshold. Further, the respective apparatus(es) may be allowed to perform such a transition in case a congestion level observed in the second pool is met or below a pre-defined threshold.

According to an exemplary embodiment of the third exemplary aspect, the transmitting of data further comprises transmitting a sidelink control information, SCI, for indicating that data is scheduled on the selected one or more resources for the at least one Rx UE. Also, according to an exemplary embodiment of the third exemplary aspect, the receiving of data further comprises receiving the SCI on at least one of the first pool and the second pool.

According to an exemplary embodiment of the third exemplary aspect, the method further comprises:

monitoring, by the at least one Rx UE, on at least one of the first pool and the second pool, for a SCI.

The at least one Rx UE may monitor for SCI that may be sent on a respective PSCCH from other apparatuses. Such other apparatuses may be in a proximity. Thus, the apparatus according to the first exemplary aspect may monitor for SCI sent on PSCCH, e.g. over a configured resource pool. The configured resource pool may consist of PSCCH resources of the first pool and/or the second pool.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 2 a flowchart showing an example embodiment of a method according to the third exemplary aspect;

DETAILED DESCRIPTION OF SOME EXEMPLARY EMBODIMENTS

The following description serves to deepen the understanding and shall be understood to complement and be read together with the description as provided in the above summary section of this specification.

Figure 1:
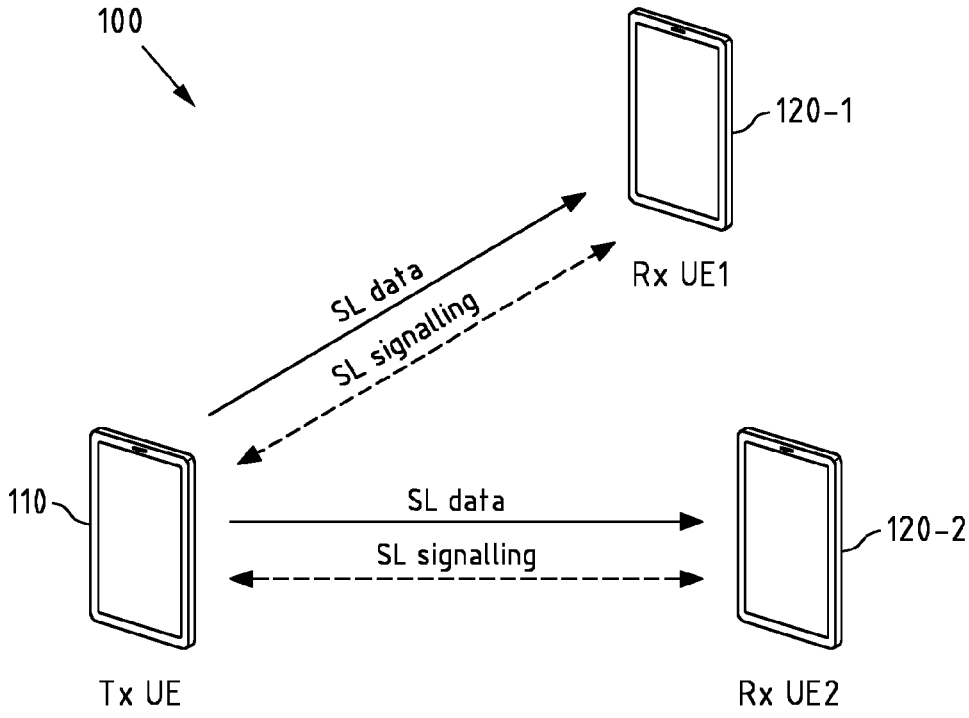
FIG. 1 a schematic block diagram of a system according to an exemplary aspect.

FIG. 1 is a schematic high-level block diagram of a system 100, as used by example embodiments according to all exemplary aspects. FIG. 1 illustrates a SL design principle of transmitting oriented one-to-many broadcast.

The system 100 comprises at least one Tx UE 110 (e.g. apparatus according to the first exemplary aspect) and at least one Rx UE, from which exemplary two Rx UEs 120-1 and 120-2 are shown. Tx UE 110 and Rx UEs 120-1 and 120-2 may be a respective electronic device such as a cellular phone. Tx UE 110 and Rx UEs 120-1 and 120-2 may be part of a mobile communication network, e.g. comprising one or more base stations (not shown in FIG. 1).

For enabling SL communication between the Tx UE 110 and Rx UEs 120-1 and 120-2, SL signaling may take place, e.g. a SCI is provided from the Tx UE 110 to the Rx UEs 120-1 and 120-2 to inform the Rx UEs 120-1 and 120-2 of one or more selected resources used for the transmission of data via SL. As illustrated by the arrows pointing from the Tx UE 110 to the Rx UEs 120-1 and 120-2, Tx UE 110 broadcasts SL data to both illustrated Rx UEs 120-1 and 120-2, e.g. using the one or more selected resources indicated in the SCI.

FIG. 2 is a flowchart 200 showing an example embodiment of a method according to the third exemplary aspect. This flowchart 200 may for instance be performed by a Tx UE (e.g. Tx UE 110 of FIG. 1) and at least one Rx UE (e.g. at least one of the Rx UEs 120-1, 120-2 of FIG. 1).

In a first step 201, by the at least one Tx UE and/or by the at least one Rx UE, a configuration of the first pool on the first carrier and the second pool on the second carrier for the SL communication is received. The configuration may be provided to UEs regardless of whether they act as a Tx UE or a Rx UE for a SL communication, since an individual UE may act as a Tx UE in one instance, and as a Rx UE in another instance of SL in Mode 2. The configuration may comprise at least a 1-to-1 relationship of the one or more SL resources between the first pool and the second pool. The configuration may be provided by a serving base station of the at least one Tx UE and/or the at least one Rx UE. As another alternative, the configuration may be provided/relayed by one UE as well. For instance, this may allow that the Tx UE and Rx UE are from different cells. Still, it is possible that one UE relays the configuration information. The configuration may enable the at least one Tx UE to select one or more resources for a SL transmission of data between the at least one Tx UE and the at least one Rx UE. The configuration may enable the at least one Rx UE to monitor and receive the SL transmission from the at least one Tx UE. The configuration may be provided by the serving base station to the at least one Tx UE and the at least one Rx UE using either common control signalling, e.g., in a broadcast system information, or multicast signaling or dedicated signalling, e.g., in a dedicated radio resource control configuration message.

In a second step 202, by the at least one Tx UE, a sensing on at least one of the first pool on the first carrier and the second pool on the second carrier for sidelink, SL, communication using a sensing-based UE-selected resource allocation mode on at least one of the first pool and the second pool is performed. The sensing may be a continuous (e.g. sensing) process, e.g. indicated in FIG. 2 by the arrow pointing back to step 202. It will be understood that step 202 may be performed and/or controlled by the at least one Tx UE continuously, thus, e.g. step 203, or step 206 do not necessarily need to be performed before step 202 may be performed and/or controlled (e.g. another time). The sensing may be performed taking into account the 1-to-1 mapping/relationship of resources of the first pool and the second pool, as disclosed in this specification.

In an optional third step 203, it is determined, by the at least one Tx UE, if the first pool (e.g. U-pool) is available for the SL communication. For instance, sensing on the first pool may be performed when the first pool is available and/or if the at least one Tx UE is enabled to utilize the first pool for SL communication.

In a fourth step 204, by the at least one Tx UE, one or more resources from at least one of the first pool and the second pool for a SL transmission based on at least one outcome of the sensing on at least one of the first pool and the second pool are selected. The selection may be done based on COT, and/or if the respective resource(s) are available at the intended time of transmission, for example.

In an optional fifth step 205, by the at least one Rx UE, on at least one of the first pool and the second pool the at least one Rx UE may monitor for SL signaling for example a SCI.

In a sixth step 206, by the at least one Tx UE, data is transmitted over SL using the selected one or more resources. The transmitting may comprise transmitting a SCI for indicating that the data is scheduled on the selected one or more resources for at least one Rx UE. Since the at least one Rx UE may monitor for such SCI (see step 205), the at least one Rx UE can monitor such a transmitted SCI. Further, in a seventh step 207, by the at least one Rx UE, data over SL using the selected one or more resources is received. The data may be scheduled for the at least one Rx UE using the selected one or more resources, e.g. as indicated in the SCI.

Figure 3:
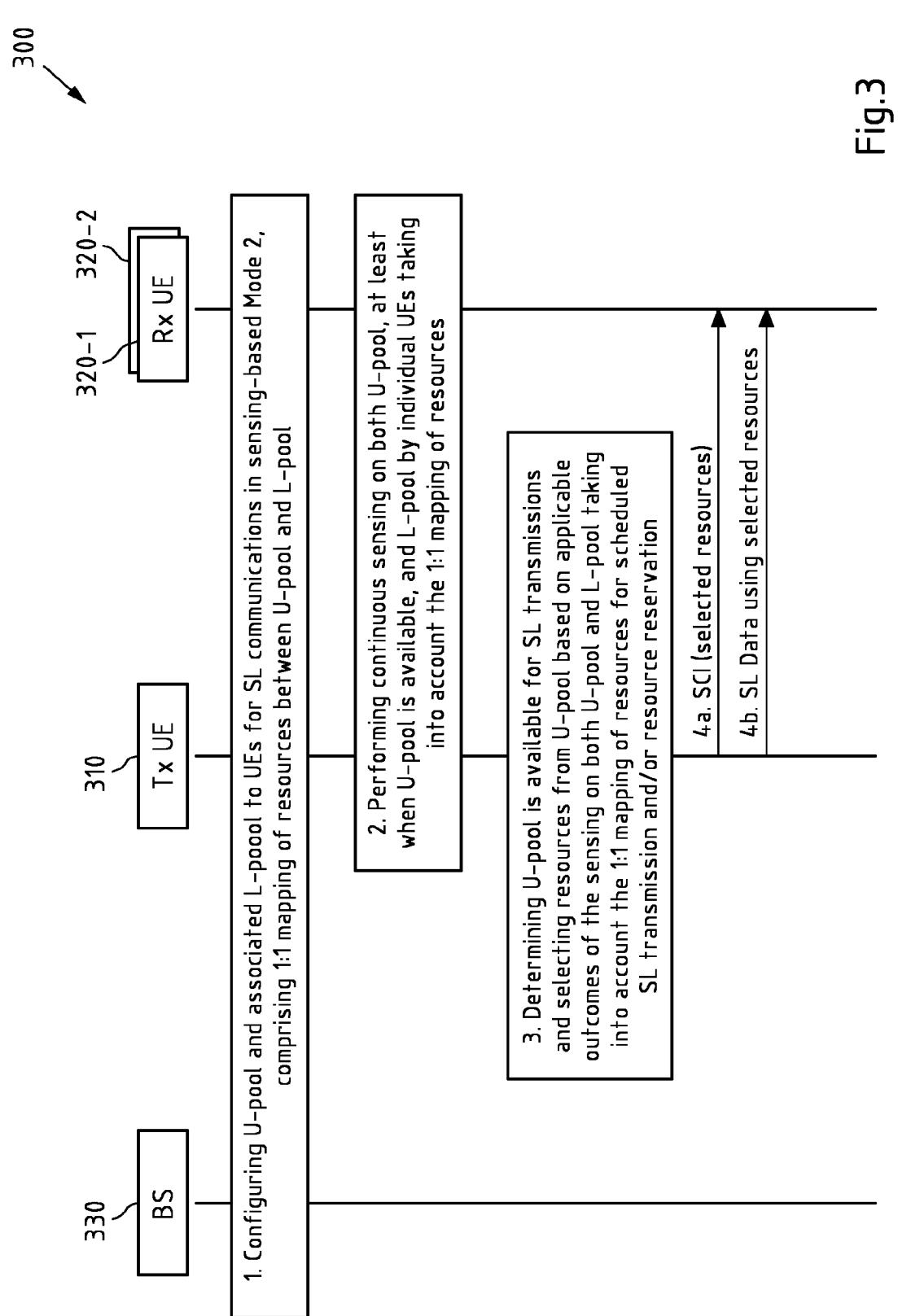
FIG. 3 another flowchart showing an example embodiment of a method according to the third exemplary aspect.

FIG. 3 is another flowchart 300 showing an example embodiment of a method according to the third exemplary aspect FIG. 3 illustrates interactions between involved network nodes according to example embodiments of all exemplary aspects.

In a first step, configuring of a first pool, U-pool, and an associated second pool, L-pool, to UEs—here Tx UE 310 and Rx UEs 320-1 and 320-2 takes place. The configuring is for SL communications in sensing-based Mode 2, comprising 1:1 mapping of resources between the first pool and the second pool. The configuring is initiated by the base station, BS, 310, e.g. by providing (e.g. sending) a respective configuration to the Tx UE 310 and the Rx UEs 320-1 and 320-2 (see also step 201 of FIG. 2).

In a second step, performing continuous sensing on at least one of the first pool and the second pool, e.g., both U-pool, at least when U-pool is available, and L-pool, by individual UEs (e.g. Tx UE 310) taking into account the 1:1 mapping of resources is done.

Then, in a third step, the Tx UE 310 determines if U-pool is available for SL transmission(s) and selects one or more resources from U-pool based on applicable outcomes of the sensing on at least one of the first pool and the second pool, e.g., both U-pool and L-pool, taking into account the 1:1 mapping of the resource(s) for scheduled SL transmission and/or resource reservation.

In a fourth step 4a, SCI comprising the selected one or more resource(s) is transmitted from the Tx UE 310 to the Rx UEs 320-1 and 320-2. Further, SL data using the selected one or more resource(s) is transmitted from the Tx UE 310 to the Rx UEs 320-1 and 320-2 is transmitted, step 4b.

Figure 4:
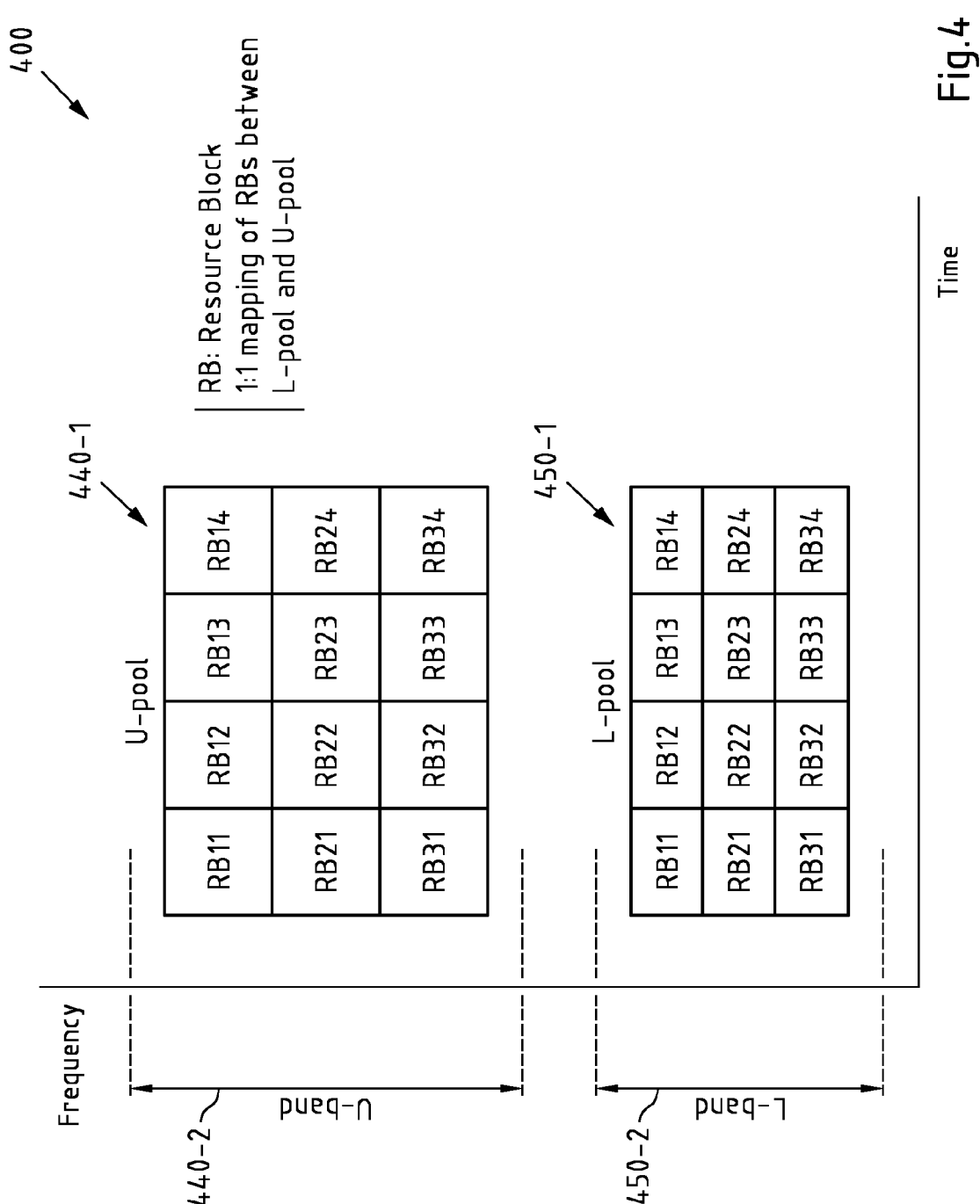
FIG. 4 an illustration of a relationship of resources between a first pool and a second pool.

FIG. 4 illustrates a 1-to-1 mapping respectively relationship 400 of SL resources between a first pool and a second pool, here between a U-pool and a L-pool.

The U-pool 440-1 comprises 12 Resource Blocks (RBs) RB11 to RB34. The L-pool 450-1 comprises also 12 RBs RB11 to RB34. The RBs of the U-pool 440-1 are in the U-band 440-2 having a frequency differing from the L-band 450-2 of the L-pool 450-1. It can be seen that the RBs of the L-pool 450-1 occupy a smaller bandwidth in the frequency domain than the RBs of the L-pool. In the time domain, the RBs of the U-pool 440-1 match the RBs of the L-pool 450-1. The respective resources may not necessarily be completely aligned in time, e.g. as long as the 1:1 mapping is between resources of the L-pool 450-1 and the U-pool 440-1 is given.

Figure 5:
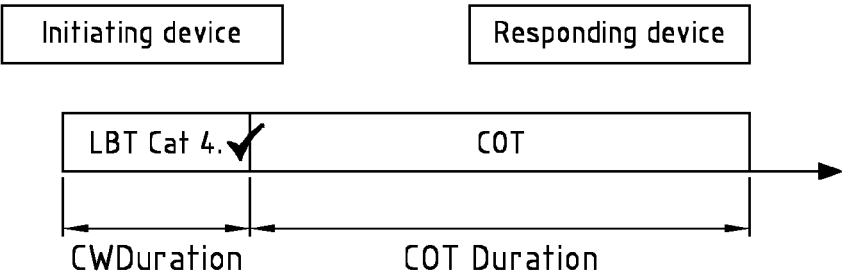
FIG. 5 an illustration of an acquisition of a COT, as used by example embodiments according to all exemplary aspects.

FIG. 5 shows an illustration of an acquisition of a COT on an unlicensed band (U-band), as used by example embodiments according to all exemplary aspects. The availability of the first pool, U-pool on U-band, is conditioned to the COT acquired on U-band.

ETSI RLAN Harmonized Standard covering essential requirements SL communication may be considered in conjunction with FIG. 5.

In sub-7 GHz unlicensed bands, the NR coexistence with other systems (e.g. IEEE 802.11) is ensured via a Listen Before Talking (LBT) channel access mechanism, where, a UE intending to perform a SL transmission needs first to successfully complete an LBT check, before being able to initiate that same transmission.

For a UE to pass an LBT check, it must observe the channel as available for a number of consecutive Clear Channel Assessment (CCA) slots. In sub-7 GHz the duration of these slots is 9 μs. The UE deems the channel as available in a CCA slot if the measured power (i.e. the collected energy during the CCA slot) is below a regulatory specified threshold (which can depend on the operating band and geographical region).

In unlicensed spectrum there are two types of shared channel access mechanisms: (i) Load Based Equipment (LBE) and (ii) Frame Based Equipment (FBE). It is noted that a system in a given deployment only applies one of them.

In LBE, when a UE initiates the communication (i.e. the UE takes the role of initiating device), then this UE has to acquire the "right" to access the channel for a certain period of time—denoted in the regulations as the Channel Occupancy Time (COT)—by applying an "extended" LBT procedure where the channel must be deemed as free for the entire duration of a Contention Window (CW). This "extended" LBT Procedure, is commonly known as LBT Category 4 (LBT Cat. 4) although in TS 27.213 it is identified as LBT Type 1. This procedure is illustrated in FIG. 5.

The duration of both the COT and CW depends on the Channel Access Priority Class (CAPC) associated with the UE's traffic, as shown in Table 1 below. Control plane traffic (such as PSCCH) is transmitted with p=1, while user plane traffic has p>1.

TABLE 1

From TS 37.213 "Table 4.2.1-1: Channel Access Priority Class (CAPC) for UL". The contention window length in CCA slots associated with each CAPC has a minimum ($CW_{min, p}$) and maximum ($CW_{max, p}$). The duration of the COT is given by $T_{ulm\ cot, p}$.

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note 1:
For p = 3, 4, $T_{ulm\ cot, p}$ = 10 ms, if the higher layer parameter absenceOfAnyOtherTechnology-r14 or absenceOfAnyOtherTechnology-r16 is provided, otherwise, $T_{ulm\ cot, p}$ = 6 ms.
Note 2:
When $T_{ulm\ cot, p}$ = 6 ms it may be increased to 8 ms by inserting one or more gaps. The minimum duration of a gap shall be 100 us. The maximum duration before including any such gap shall be 6 ms.

Figure 6:
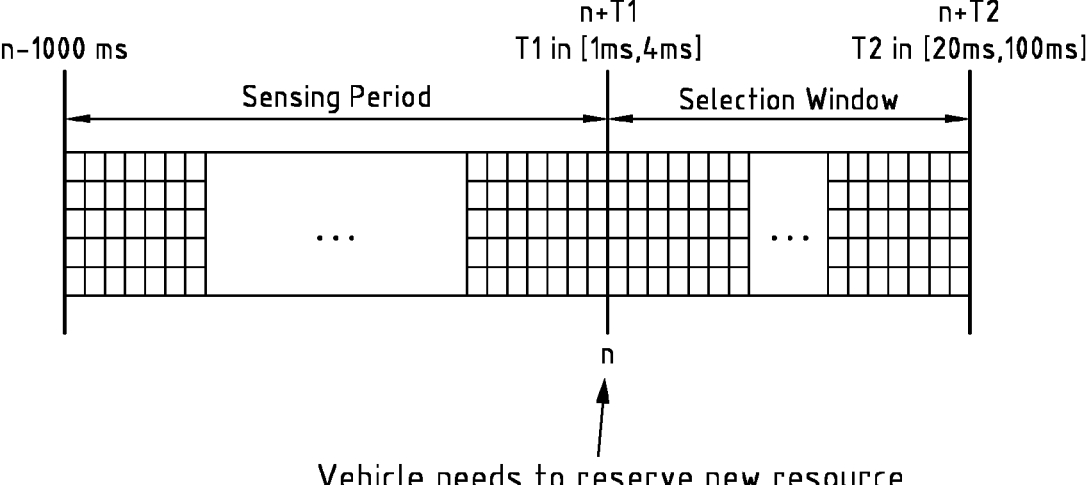
FIG. 6 an illustration of sensing and resource selection in SL Mode 2 operation, as used by example embodiments according to all exemplary aspects.

FIG. 6 shows an illustration of sensing and resource selection in SL Mode 2, as used by example embodiments according to all exemplary aspects.

For continuous transmissions during the current COT without a need to perform an LBT, the gap between 2 transmissions must be kept under 16 ns. In case the gap exceeds 16 ns, the transmitting device (e.g. Tx UE) may continue transmissions in the current COT provided that an additional LBT detects no radio local area network (RLAN) transmissions with a level above a pre-defined threshold. The additional LBT may be performed within a gap and within the observation slot immediately before transmission, all counted for within the current COT.

The current COT may be granted by the device which acquired the current COT to other devices to transmit on the channel, provided that the above requirements on continuous transmission among the devices during the current COT are met.

It is noted that in FBE, the responding device(s) (e.g. Rx UE) is (are) allowed to transmit feedback such as ACK to a received packet within the current COT without a need of an additional LBT. Yet, in LBE, the responding devices might have to perform a LBT (depending on the timing the transmission form the initiating device and the responding device feedback) before being able to access the channel to transmit the feedback.

Figure 7:
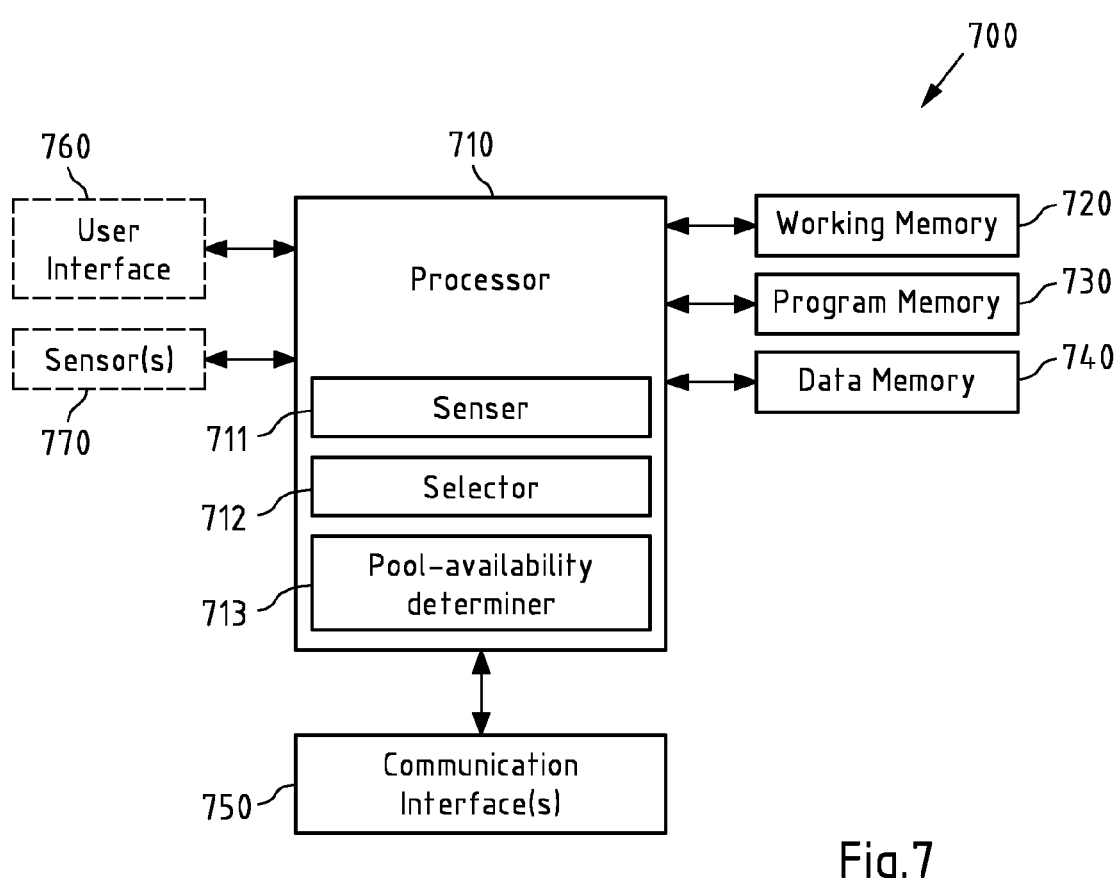
FIG. 7 a schematic block diagram of an apparatus configured to perform the method according to the first exemplary aspect.

FIG. 7 is a schematic block diagram of an apparatus 700 according to an exemplary aspect, which may for instance represent the Tx UE 110 of FIG. 1.

Apparatus 700 comprises a processor 710, working memory 720, program memory 730, data memory 740, communication interface(s) 750, an optional user interface 760 and an optional sensor(s) 770.

Apparatus 700 may for instance be configured to perform and/or control or comprise respective means (at least one of 710 to 770) for performing and/or controlling the method according to the first exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the first exemplary aspect.

Processor 710 may for instance comprise a senser 711 as a functional and/or structural unit. Senser 711 may for instance be configured to perform a sensing on at least one of a first pool (e.g. U-pool) and a second pool (e.g. L-pool) for SL communication using a sensing-based UE-selected resource allocation mode on at least one of the first pool and the second pool (see step 202 of FIG. 2).

Processor 710 may for instance comprise a selector 712 as a functional and/or structural unit. Selector 712 may for instance be configured to select one or more resources from at least one of the first pool and the second pool for a SL transmission (see step 204 of FIG. 2).

Processor 710 may for instance comprise an optional pool-availability determiner 713 as a functional and/or structural unit. Pool-availability determiner 713 may for instance be configured to determine if the first pool is available for SL communication (see step 203 of FIG. 2).

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the first exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller (s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more configurations, one or more outcomes of a performed sensing, one or more outcomes of a determining if a first pool (e.g. U-pool) is available for SL transmission, one or more outcomes of a selecting of one or more resources from at least one of the first pool or a second pool (e.g. L-pool), data of a SL transmission, or a combination thereof, to name but a few non-limiting examples.

Communication interface(s) 750 enable apparatus 700 to communicate with other entities, e.g. with at least one of the Tx UEs 120-1 and/or 120-2 of FIG. 1. The communication interface(s) 750 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 700 to communicate with other entities, for instance with a serving base station of a mobile communication network (not shown in FIG. 1).

User interface 760 is optional and may comprise a display for displaying information to a user and/or an input device (e.g. a keyboard, keypad, touchpad, mouse, etc.) for receiving information from a user.

Sensor(s) 770 are optional and may for instance comprise a barometric sensor, e.g. to gather pressure information.

Some or all of the components of the apparatus 300 may for instance be connected via a bus. Some or all of the components of the apparatus 300 may for instance be combined into one or more modules.

Figure 8:
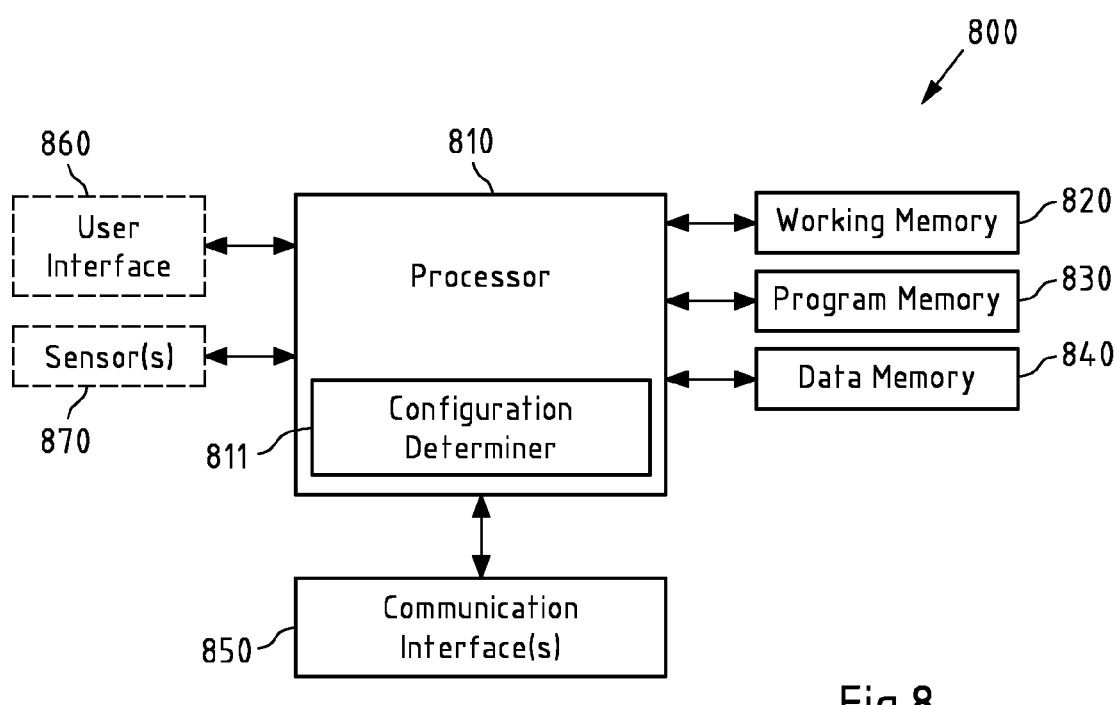
FIG. 8 a schematic block diagram of an apparatus configured to perform the method according to the second exemplary aspect.

FIG. 8 is a schematic block diagram of an apparatus 800 according to an exemplary aspect, which may for instance represent a base station of a mobile communication network, e.g. a serving base station for Tx UE 110 and/or Rx UEs 120-1 and/or 120-2 of FIG. 1.

Apparatus 800 comprises a processor 810, working memory 820, program memory 830, data memory 840, communication interface(s) 850, an optional user interface 860 and an optional sensor(s) 870.

Apparatus 800 may for instance be configured to perform and/or control or comprise respective means (at least one of 810 to 870) for performing and/or controlling the method according to the second exemplary aspect. Apparatus 800 may as well constitute an apparatus comprising at least one processor (810) and at least one memory (820) including computer program code, the at least one memory and the computer program code configured to, with the at least one processor, cause an apparatus, e.g. apparatus 800 at least to perform and/or control the method according to the second exemplary aspect.

Processor 810 may for instance comprise a configuration determiner 811 as a functional and/or structural unit. Configuration determiner 811 may for instance be configured to determine a configuration to be provided to one or more UEs (e.g. Tx UE 110 and/or Rx UEs 120-1 and/or 120-2 of FIG. 1) e.g. for enabling a sensing on at least one of a first pool (e.g. U-pool) and a second pool (e.g. L-pool) for SL communication using a sensing-based UE-selected resource allocation mode on at least one of the first pool and the second pool (see step 202 of FIG. 2).

Processor 810 may for instance further control the memories 820 to 840, the communication interface(s) 850, the optional user interface 860 and the optional sensor(s) 870.

Processor 810 may for instance execute computer program code stored in program memory 830, which may for instance represent a computer readable storage medium comprising program code that, when executed by processor 810, causes the processor 810 to perform the method according to the first exemplary aspect.

Processor 810 (and also any other processor mentioned in this specification) may be a processor of any suitable type. Processor 810 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller (s), one or more application-specific integrated circuit(s) (ASIC(s)), or one or more computer(s). The relevant structure/hardware has been programmed in such a way to carry out the described function. Processor 810 may for instance be an application processor that runs an operating system.

Program memory 830 may also be included into processor 810. This memory may for instance be fixedly connected to processor 810, or be at least partially removable from processor 810, for instance in the form of a memory card or stick. Program memory 830 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 830 may also comprise an operating system for processor 810. Program memory 830 may also comprise a firmware for apparatus 800.

Apparatus 800 comprises a working memory 820, for instance in the form of a volatile memory. It may for instance be a Random Access Memory (RAM) or Dynamic RAM (DRAM), to give but a few non-limiting examples. It may for instance be used by processor 810 when executing an operating system and/or computer program.

Data memory 840 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 840 may for instance store may for instance store one or more configurations, one or more outcomes of a performed sensing, one or more outcomes of a determining if a first pool (e.g. U-pool) is available for SL transmission, one or more outcomes of a selecting of one or more resources from at least one of the first pool or a second pool (e.g. L-pool), data of a SL transmission, or a combination thereof, to name but a few non-limiting examples.

Communication interface(s) 850 enable apparatus 800 to communicate with other entities, e.g. with at least one Rx UEs 110 of FIG. 1. The communication interface(s) 850 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 800 to communicate with other entities, for instance with a serving base station of a mobile communication network (not shown in FIG. 1).

User interface 860 is optional and may comprise a display for displaying information to a user and/or an input device (e.g. a keyboard, keypad, touchpad, mouse, etc.) for receiving information from a user.

Sensor(s) 870 are optional and may for instance comprise a barometric sensor, e.g. to gather pressure information.

Some or all of the components of the apparatus 800 may for instance be connected via a bus. Some or all of the components of the apparatus 800 may for instance be combined into one or more modules.

The following embodiments shall also be considered to be disclosed:

Embodiment 1

A method performed and/or controlled by at least one apparatus, the method comprising:
  performing a sensing on at least one of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources;
  selecting one or more resources from at least one of the first pool and the second pool for a SL transmission based on at least one outcome of the sensing on at least one of the first pool and the second pool; and
  transmitting data over SL using the selected one or more resources.

Embodiment 2

The method according to embodiment 1, further comprising:
  receiving a configuration of the first pool on the first carrier and the second pool on the second carrier for the SL communication, wherein the configuration comprises the at least 1-to-1 relationship of the one or more SL resources between the first pool and the second pool.

Embodiment 3

The method according to embodiment 1 or embodiment 2, wherein the configuration further comprises control information causing the apparatus to use the first pool instead of the second pool for SL communication if the first pool is available, or else to use the second pool.

Embodiment 4

The method according to any of the preceding embodiments, the method further comprising:
  determining if the first pool is available for the SL communication; and
  wherein the one or more resources are selected from the first pool based on applicable outcomes of the determining and the sensing on at least one of the first pool and the second pool, and taking into account the at least 1-to-1 relationship for the SL communication.

Embodiment 5

The method according to any of the preceding embodiments, further comprising:
  indicating over SL that the apparatus is not enabled to use the first pool when using the second pool to transmit data over SL for SL communication

Embodiment 6

The method according to any of the preceding embodiments, wherein the first carrier is an unlicensed carrier and the second carrier is a licensed carrier.

Embodiment 7

The method according to any of the preceding embodiments, wherein the at least 1-to-1 relationship comprises a 1-to-N mapping of SL resources between the first pool and the second pool, wherein N resources of the first pool are mapped to one resource in the second pool.

Embodiment 8

The method according to any of the preceding embodiments, wherein the configuration further comprises a setting for the apparatus to use the first pool instead for SL transmissions whenever the first pool is available.

Embodiment 9

The method according to any of the embodiments 2 to 8, wherein access to the SL resources in the second pool is controlled via a traffic priority setting.

Embodiment 10

The method according to any of the embodiments 2 to 9, wherein the configuration further comprises a setting for the apparatus to use the first pool instead for SL transmissions whenever the first pool is available.

Embodiment 11

A method performed and/or controlled by at least one apparatus, the method comprising:
  determining a configuration of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources, and wherein the configuration comprises the at least 1-to-1 relationship of SL resources between the first pool and the second pool; and providing the configuration.

Embodiment 12

The method according to embodiment 11, wherein the configuration is provided to one or more UEs for enabling the UEs to perform SL communication using the sensing-based UE-selected resource allocation mode.

Embodiment 13

The method according to embodiment 11 or embodiment 12, wherein the first carrier is an unlicensed carrier and the second carrier is a licensed carrier.

Embodiment 14

The method according to any of the embodiments 11 to 13, wherein the at least 1-to-1 relationship comprises a 1-to-N mapping of SL resources between the first pool and the second pool, wherein N resources of the first pool are mapped to one resource in the second pool.

Embodiment 15

The method according to any of the embodiments 11 to 14, wherein the configuration further comprises a setting for the apparatus to use the first pool instead for SL transmissions whenever the first pool is available.

Embodiment 16

The method according to any of the embodiments 11 to 15, wherein access to the SL resources in the second pool is controlled via a traffic priority setting.

Embodiment 17

The method according to any of the embodiments 11 to 16, wherein the configuration further comprises a setting for the apparatus to use the first pool instead for SL transmissions whenever the first pool is available.

Embodiment 18

An apparatus configured to perform and/or control or comprising respective means for performing and/or controlling the method of any of the embodiments 1 to 10.

Embodiment 19

An apparatus configured to perform and/or control or comprising respective means for performing and/or controlling the method of any of the embodiments 11 to 17.

Embodiment 20

An apparatus comprising at least one processor and at least one memory including computer program code, the at least one memory and the computer program code configured to, with the at least one processor, cause an apparatus at least to perform and/or control the method of any of the embodiments 1 to 10.

Embodiment 21

An apparatus comprising at least one processor and at least one memory including computer program code, the at least one memory and the computer program code configured to, with the at least one processor, cause an apparatus at least to perform and/or control the method of any of the embodiments 11 to 17.

Embodiment 22

A tangible computer-readable medium storing computer program code, the computer program code when executed by a processor causing an apparatus to perform and/or control:

performing a sensing on at least one of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources;

selecting one or more resources from at least one of the first pool and the second pool for a SL transmission based on at least one outcome of the sensing on at least one of the first pool and the second pool; and transmitting data over SL using the selected one or more resources.

Embodiment 23

A tangible computer-readable medium storing computer program code, the computer program code when executed by a processor causing an apparatus to perform and/or control:

determining a configuration of a first pool on a first carrier and a second pool on a second carrier for sidelink, SL, communication using a sensing-based UE-selected resource allocation mode on at least one of the first pool and the second pool, wherein the first pool and the second pool have at least a 1-to-1 relationship of SL resources, and wherein the configuration comprises the at least 1-to-1 relationship of SL resources between the first pool and the second pool; and providing the configuration.

Embodiment 24

A system, comprising:

at least one apparatus according to embodiment 18 or 20; and at least one apparatus according to embodiment 19 or 21.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:
1. An apparatus, comprising:
at least one processor; and
at least one memory storing instructions that, when executed with the at least one processor, cause the apparatus to perform:
sensing on at least one of a first pool on a first carrier or a second pool on a second carrier for sidelink communication using a sensing-based user equipment-selected resource allocation mode on at least one of the first pool or the second pool, wherein the first pool is an unlicensed pool, the first carrier is an unlicensed carrier, the second pool is a licensed pool, and the second carrier is a licensed carrier, wherein the first pool and the second pool have at least a 1-to-1 relationship of sidelink resources, and wherein the sensing is performed taking into account the at least 1-to-1 relationship of sidelink resources;
selecting one or more resources from at least one of the first pool or the second pool for a sidelink transmission based on at least one outcome of the sensing on at least one of the first pool or the second pool; and transmitting data over a sidelink using the selected one or more resources.

2. The apparatus according to claim 1, wherein the instructions, when executed with the at least one processor, cause the apparatus further to perform receiving a configuration of the first pool on the first carrier and the second pool on the second carrier for the sidelink communication, wherein the configuration comprises the at least 1-to-1 relationship of the one or more resources between the first pool and the second pool.

3. The apparatus according to claim 2, wherein the configuration further comprises control information causing the instructions, when executed with the at least one processor, to cause the apparatus to use the first pool instead of the second pool for sidelink communication if the first pool is available, or else to use the second pool.

4. The apparatus according to claim 1, wherein the instructions, when executed with the at least one processor, cause the apparatus further to perform determining if the first pool is available for the sidelink communication, wherein the one or more resources are selected from the first pool based on applicable outcomes of the determining and the sensing on at least one of the first pool or the second pool and taking into account the at least 1-to-1 relationship for the sidelink communication.

5. The apparatus according to claim 1, wherein the instructions, when executed with the at least one processor, cause the apparatus further to perform indicating over the sidelink that the apparatus is not enabled to use the first pool when using the second pool to transmit data over the sidelink for sidelink communication.

6. The apparatus according to claim 1, wherein the at least 1-to-1 relationship is a mapping of sidelink resources between the first pool and the second pool and is applied for a plurality of sidelink channels.

7. The apparatus according to claim 1, wherein the at least 1-to-1 relationship comprises a 1-to-N mapping of sidelink resources between the first pool and the second pool, wherein N resources of the first pool are mapped to one resource in the second pool.

8. The apparatus according to claim 2, wherein the configuration further comprises a setting for the apparatus to use the first pool instead for sidelink transmissions whenever the first pool is available.

9. The apparatus according to claim 1, wherein access to the sidelink resources in the second pool is controlled with a traffic priority setting.

10. An apparatus, comprising:
at least one processor; and
at least one memory storing instructions that, when executed with the at least one processor, cause the apparatus to perform:
determining a configuration of a first pool on a first carrier and a second pool on a second carrier for sidelink communication using a sensing-based user equipment-selected resource allocation mode on at least one of the first pool or the second pool, wherein the first pool is an unlicensed pool, the first carrier is an unlicensed carrier, the second pool is a licensed pool, and the second carrier is a licensed carrier, wherein the first pool and the second pool have at least a 1-to-1 relationship of sidelink resources, wherein the configuration comprises the at least 1-to-1 relationship of sidelink resources between the first pool and the second pool, and wherein sensing on the at least one of the first pool or the second pool is performed taking into account the at least 1-to-1 relationship of sidelink resources; and providing the configuration.

11. The apparatus according to claim 10, wherein the instructions, when executed with the at least one processor, provide the configuration to one or more user equipment for enabling the user equipment to perform sidelink communication using the sensing-based user equipment-selected resource allocation mode.

12. A method, comprising:

performing, with at least one transmitter, a sensing on at least one of a first pool on a first carrier or a second pool on a second carrier for sidelink communication using a sensing-based user equipment-selected resource allocation mode on at least one of the first pool or the second pool, wherein the first pool is an unlicensed pool, the first carrier is an unlicensed band, the second pool is a licensed pool, and the second carrier is a licensed band, wherein the first pool and the second pool have at least a 1-to-1 relationship of sidelink resources, and wherein the sensing is performed taking into account the at least 1-to-1 relationship of sidelink resources;

selecting, with the at least one transmitter, one or more resources from at least one of the first pool or the second pool for a sidelink transmission based on at least one outcome of the sensing on at least one of the first pool or the second pool; and transmitting, with the at least one transmitter, data over a sidelink using the selected one or more resources.

13. The method according to claim 12, wherein the transmitting of the data comprises transmitting a sidelink control information for indicating that data is scheduled on the selected one or more resources for at least one receiver user equipment.

14. The method according to claim 13, further comprising:

monitoring, with the at least one receiver user equipment, on at least one of the first pool or the second pool, for the sidelink control information.

15. The method according to claim 12, further comprising:

receiving, with at least one receiving user equipment, data over the sidelink.

16. A non-transitory program storage device readable with an apparatus, tangibly embodying a program of instructions executable with the apparatus for performing operations comprising the method of claim 12.

17. A non-transitory program storage device, tangibly embodying a program of instructions which, when executed with an apparatus, causes the apparatus to perform operations the method of claim 13.

18. A non-transitory program storage device, tangibly embodying a program of instructions which, when executed with an apparatus, causes the apparatus to perform operations the method of claim 14.

19. A non-transitory program storage device, tangibly embodying a program of instructions which, when executed with an apparatus, causes the apparatus to perform operations the method of claim 15.

* * * * *